United States Patent
Albert (10) Patent No.: US 11,332,108 B2
(45) Date of Patent: May 17, 2022

(54) VEHICLE BRAKE SYSTEM FOR SELF-CONTAINED CIRCUIT FILLING AND METHOD OF OPERATING

(71) Applicant: Robert Bosch GmbH, Stuttgart (DE)

(72) Inventor: Timothy J. Albert, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/759,781

(22) PCT Filed: Oct. 29, 2018

(86) PCT No.: PCT/EP2018/079538
§ 371 (c)(1),
(2) Date: Apr. 28, 2020

(87) PCT Pub. No.: WO2019/091810
PCT Pub. Date: May 16, 2019

(65) Prior Publication Data
US 2021/0237701 A1  Aug. 5, 2021

Related U.S. Application Data (60) Provisional application No. 62/583,765, filed on Nov. 9, 2017.

(51) Int. Cl.
*B60T 13/74* (2006.01)
*B60T 8/40* (2006.01)
(Continued)

(52) U.S. Cl.
CPC .......... *B60T 8/4081* (2013.01); *B60T 7/042* (2013.01); *B60T 13/686* (2013.01); *B60T 13/745* (2013.01);
(Continued)

(58) Field of Classification Search
CPC ................ B60T 13/686; B60T 13/745; B60T 2270/402; B60T 2270/406; B60T 2270/413; B60T 17/222
See application file for complete search history.

(56) References Cited

U.S. PATENT DOCUMENTS 3,608,984 A   9/1971  Skoyles
5,302,008 A   4/1994  Miyake et al.
(Continued)

FOREIGN PATENT DOCUMENTS

CN   1880136 A    12/2006
CN   103786707 A   5/2014
(Continued)

OTHER PUBLICATIONS

International Search Report and Written Opinion for Application No. PCT/EP2018/079538 dated Dec. 21, 2018 (15 pages).
(Continued)

*Primary Examiner* — Bradley T King
(74) *Attorney, Agent, or Firm* — Michael Best & Friedrich LLP (57) ABSTRACT

A brake system (20) for a vehicle includes a brake unit (20A; 20B) having: a fluid reservoir (32) for containing a volume of brake fluid therein, an ECU (1000), and an electronically-controlled plunger device (60) operable to stroke in response to a control signal from the ECU (1000) to supply fluid pressure to at least one wheel cylinder (RL, RR) for vehicle braking. The plunger device (60) includes: a rod (108) coupled to an actuator (M), a primary seal (100) coupled to the rod (108) and arranged to seal against an inner wall of a plunger chamber, and a secondary seal (104) surrounding the rod (108) to seal an interface where the rod (108) exits the plunger chamber. A portion of the plunger chamber between the primary and secondary seals (100, 104) is coupled through a switchable valve (112) to the fluid reser-
(Continued)

voir (32). A method of operating a brake system (20) for self-contained brake circuit filling comprises the steps of providing a brake unit (20A; 20B), performing a pressure bleed on a first portion of a brake circuit, supplying pressurized brake fluid to a wheel (RL) coupled to the first portion and supplying brake fluid from a reservoir (32) to a second portion of the brake circuit by switching a valve (112) while using a plunger device (60) under control of an ECU (1000).

15 Claims, 6 Drawing Sheets

(51) Int. Cl.
  *B60T 7/04* (2006.01)
  *B60T 13/68* (2006.01)
(52) U.S. Cl.
  CPC ....... *B60T 2220/04* (2013.01); *B60Y 2400/81* (2013.01)

(56) References Cited

U.S. PATENT DOCUMENTS

| | | | |
|---|---|---|---|
| 6,179,392 | B1 | 1/2001 | Baechle et al. |
| 6,193,031 | B1 | 2/2001 | Baechle et al. |
| 6,629,585 | B2 | 10/2003 | Williamson |
| 7,344,206 | B2 | 3/2008 | Schmidt |
| 8,573,712 | B2 | 11/2013 | Bachle et al. |
| 9,623,856 | B2 | 4/2017 | Kamiya et al. |
| 2003/0234573 | A1 | 12/2003 | Reuter et al. |
| 2004/0040807 | A1 | 3/2004 | Burgdorf et al. |
| 2006/0192426 | A1 | 8/2006 | Baechle et al. |
| 2007/0126282 | A1 | 6/2007 | Hwang |
| 2008/0284242 | A1 | 11/2008 | Ganzel |
| 2013/0256071 | A1 | 10/2013 | Jones et al. |
| 2014/0354036 | A1* | 12/2014 | Koo ................. B60T 13/745 303/6.01 |
| 2017/0144644 | A1* | 5/2017 | Kim ................. B60T 8/4081 |
| 2018/0334148 | A1* | 11/2018 | Feigel ................. B60T 13/662 |
| 2019/0031165 | A1* | 1/2019 | Besier ................. B60T 7/042 |
| 2019/0308601 | A1* | 10/2019 | Maj ................. B60T 7/042 |
| 2020/0216054 | A1* | 7/2020 | Anderson ............. B60T 11/323 |
| 2020/0216055 | A1* | 7/2020 | Lee ................. B60T 13/745 |
| 2021/0053547 | A1* | 2/2021 | Ganzel ................. G01F 25/22 |
| 2021/0061240 | A1* | 3/2021 | Zhang ................. B60T 13/146 |
| 2021/0155215 | A1* | 5/2021 | Ganzel ................. B60T 8/326 |
| 2021/0323524 | A1* | 10/2021 | Lim ................. B60T 13/745 |

FOREIGN PATENT DOCUMENTS

| | | |
|---|---|---|
| CN | 104149764 A | 11/2014 |
| CN | 104176027 A | 12/2014 |
| CN | 107010039 A | 8/2017 |
| DE | 422904 C | 12/1925 |
| DE | 4229041 A1 | 3/1993 |
| DE | 102013205639 A1 | 10/2014 |
| DE | 102015211877 A1 | 12/2015 |
| DE | 102014215030 A1 | 2/2016 |
| DE | 102016222830 A1 | 5/2017 |
| EP | 1181182 A1 | 2/2002 |
| FR | 2012496 A | 3/1970 |
| KR | 101621823 B1 | 5/2016 |
| KR | 20170040358 A | 4/2017 |
| WO | 0069721 A1 | 11/2000 |
| WO | 2011141158 A2 | 11/2011 |
| WO | 2013087258 A1 | 6/2013 |

OTHER PUBLICATIONS

Translation of National Intellectual Property Administration, P.R. China, First Office Action for Application No. 201880072354.3 dated Oct. 11, 2021 (14 pages).

Translation of National Intellectual Property Administration, P.R. China Second Office Action and Supplementary Search Report for Application No. 201880072354.3 dated Mar. 4, 2022 (8 pages).

* cited by examiner

VEHICLE BRAKE SYSTEM FOR SELF-CONTAINED CIRCUIT FILLING AND METHOD OF OPERATING

BACKGROUND

The present invention relates to vehicles and vehicle braking systems, which at the time of installation require one or more circuits to be filled with brake fluid and bled of trapped gas (e.g., air).

SUMMARY

In one aspect, the invention provides a brake system for a vehicle including a brake unit having: a fluid reservoir for containing a volume of brake fluid therein, an ECU, and an electronically-controlled plunger operable to stroke in response to a control signal from the ECU to supply fluid pressure to at least one wheel cylinder for vehicle braking. The plunger device includes: a rod coupled to an actuator, a primary seal coupled to the rod and arranged to seal against an inner wall of a plunger chamber, and a secondary seal surrounding the rod to seal an interface where the rod exits the plunger chamber. A portion of the plunger chamber between the primary and secondary seals is coupled through a switchable valve to the fluid reservoir.

In another aspect, the invention provides a method of operating a vehicle brake system for self-contained brake circuit filling. The method includes: providing a brake unit having a reservoir filled with brake fluid, and performing a pressure bleed on a first portion of a brake circuit within the brake unit by a first operation of a plunger in an advancing direction, under control of an ECU of the brake system. The method further includes: supplying pressurized brake fluid to a first wheel cylinder coupled to the first portion of the brake circuit, while simultaneously evacuating a second portion of the brake circuit in fluid communication with a vacuum chamber of the plunger, by a second operation of the plunger in the advancing direction, under control of the ECU. The method further includes supplying brake fluid from the reservoir into the second portion of the brake circuit by switching an auto-fill valve positioned between the reservoir and the vacuum chamber into an open condition, under control of the ECU.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
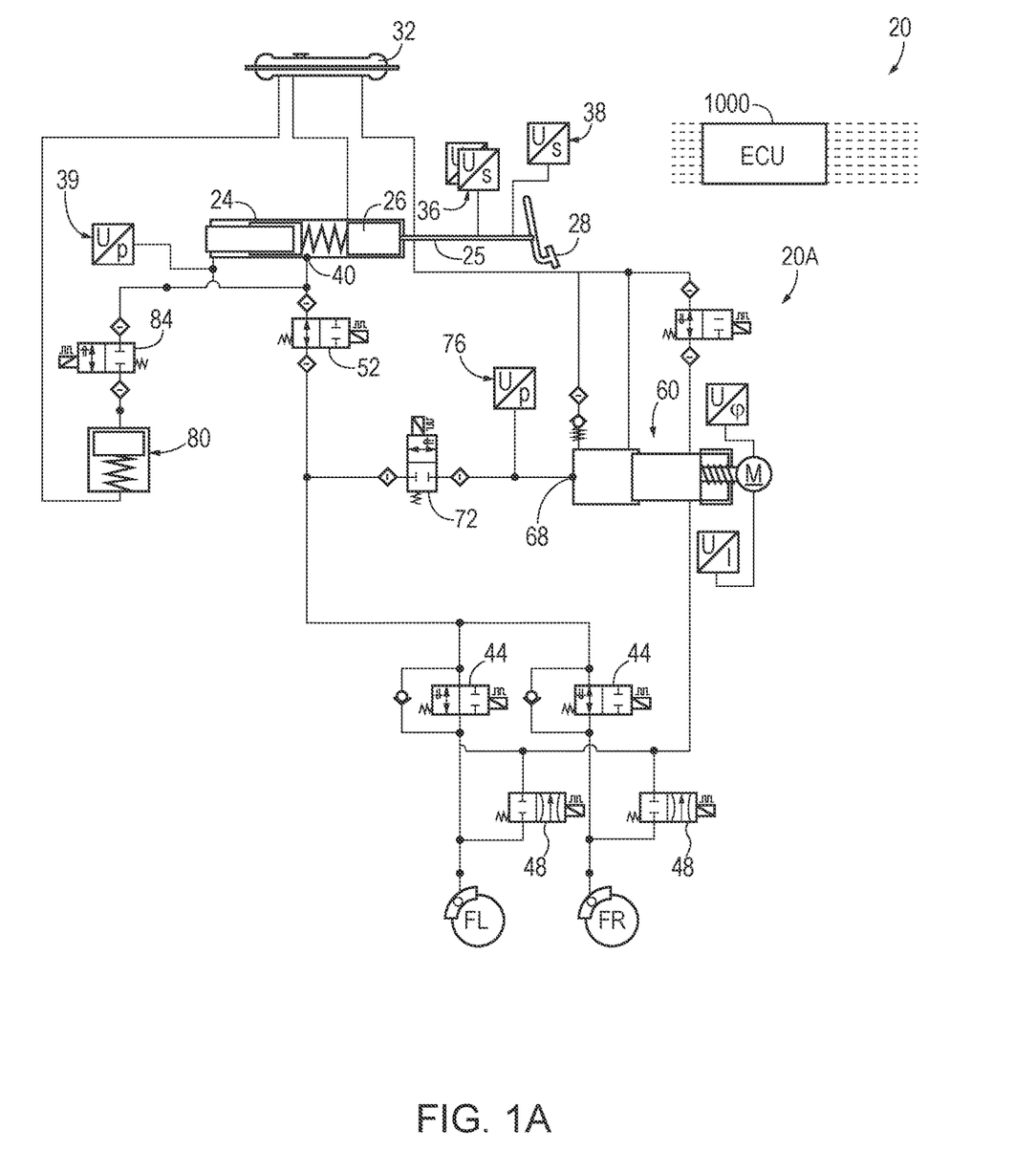
FIG. 1A is a schematic view of a first portion of a vehicle brake system according to one construction of the present invention, the first portion including a first unit having a circuit for a first pair of wheel cylinders.
Figure 1B:
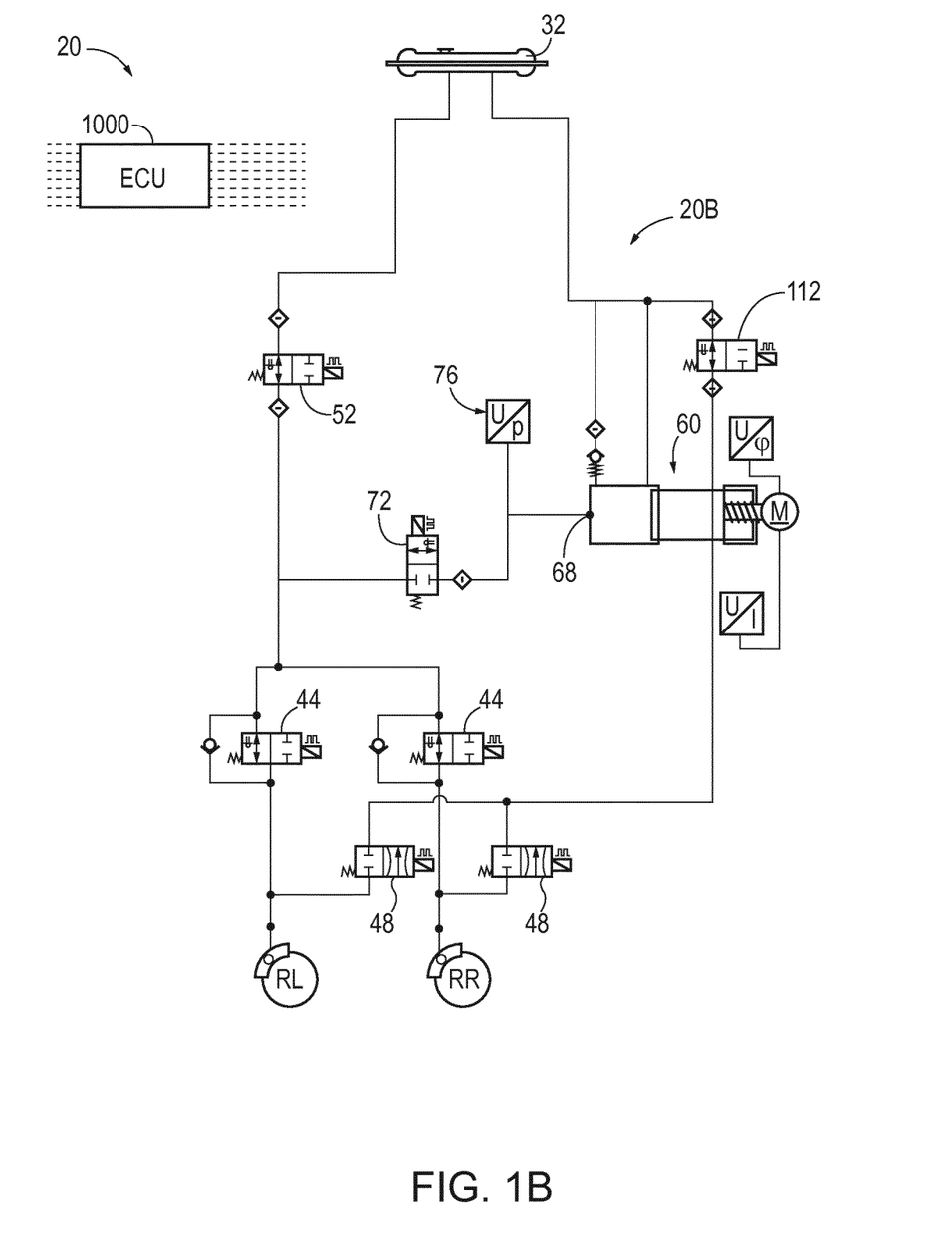
FIG. 1B is a schematic view of a second portion of the vehicle brake system, the second portion including a second unit having a circuit for a second pair of wheel cylinders.

The braking system 20 of FIGS. 1A, 1B is illustrated in two separate units 20A, 20B according to one aspect of the invention. The two separate units 20A, 20B can be deployed at two respective axles of a single vehicle as two distinct hydraulic units with no fluid connection extending therebetween. However, the two units 20A, 20B are electrically coupled (e.g., over a vehicle network such as CAN-bus) and elements of the two units 20A, 20B are controlled by a common electronic control unit (ECU) 1000. The first unit 20A can be a front axle unit and includes a master cylinder 24 having an input side coupled with an input rod 25 to a brake pedal 28 to pressurize hydraulic fluid therein. The master cylinder 24 includes a piston 26 that is coupled to the brake pedal 28 (e.g., mechanically coupled to move directly therewith). The piston 26 pressurizes hydraulic fluid in a chamber of the master cylinder 24 to be output from the chamber at an outlet 40. In other constructions of the invention where the two units 20A, 20B are joined hydraulically, the master cylinder 24 can include an additional piston and an additional outlet coupled to an additional circuit. A fluid reservoir 32 is provided atop the master cylinder 24 to maintain a supply of brake fluid thereto. One or more sensors 36, 38 can be provided at the inlet side of the master cylinder 24, and may include a pedal travel sensor 36 and/or a pedal force sensor 38. Either or both of these sensors 36, 38 can be used (together or separately) as an input to the ECU 1000 to determine a level of a driver's braking request. Additionally, one or more sensors can be provided at an output side of the master cylinder 24, such as a pressure transducer 39 operable to detect a pressure generated within the master cylinder 24 by operation of the pedal 28 and the piston 26. The pressure transducer 39 may, alone or in combination with one or both of the sensors 36, 38, provide a signal to the ECU 1000 for determining a level of a driver's braking request. The pressure transducer 39 may be coupled to a secondary chamber separated from the first chamber by a secondary floating piston, the secondary chamber having no connection to the brake circuit or wheel cylinders FL, FR in the illustrated construction.

The master cylinder output 40 is selectively in fluid communication with a first braking circuit, which in the illustrated construction includes a pair of wheel cylinders FL, FR operable to slow down the wheels of a vehicle on which the braking system 20 is provided. The wheel cylinders FL, FR are associated with a set of front vehicle wheels. However, in other constructions, the first unit 20A can be coupled to a circuit associated with a set of rear vehicle wheels, or a diagonal set of vehicle wheels. The braking circuit is subdivided into two sub-circuits, one for each wheel cylinder FL, FR. Each sub-circuit includes an inlet valve 44 and an outlet valve 48 associated with the respective wheel cylinder. The inlet valves 44 are normally-open and can be electrically closed by the ECU 1000 to stop or limit pressurized hydraulic fluid supplied to the wheel cylinder. The outlet valves 48 are normally-closed and can be electrically opened by the ECU 1000 to relieve pressurized hydraulic fluid at the wheel cylinder, to the reservoir 32. The master cylinder outlet 40 is coupled to the braking circuit through a normally-open isolation valve 52. The isolation valve 52 is operable to be closed by the ECU 1000 to fluidly separate or isolate the master cylinder 24, and thus the brake pedal 28, from the braking circuit having the wheel cylinders FL, FR.

Although the master cylinder 24 is capable of providing mechanical braking from the brake pedal 28 to the wheel cylinders FL, FR of the braking circuits, the first unit 20A can be provided with an alternate or auxiliary device, separate from the brake pedal 28. This device can include a plunger 60 operable (e.g., by a motor M or other actuator) for generating hydraulic fluid pressure to the wheel cylinders FL, FR for the requisite braking need. For example, an outlet 68 (e.g., main outlet port) of the plunger 60 can be coupled to the braking circuit through an apply pressure control valve 72. The apply pressure control valve 72 can be a controller-modulated solenoid valve (e.g., having a range of open positions, or receiving a pulse-width modulation signal to achieve a similar effect) operable to control the pressure supplied from the plunger 60. One or more pressure sensors 76 can be positioned along the fluid path between the plunger outlet 68 and the respective inlet valves 44 and operable to report the fluid pressure to the ECU 1000. The pressure sensor 76 can be referred to as an "active circuit" pressure sensor as it senses and reports the fluid pressure in the passage(s) coupled to the wheel cylinders FL, FR, as contrasted with fluid pressure in the master cylinder 24 or a simulator circuit, which are not part of an active braking circuit during brake-by-wire operation.

In addition to the active braking components in the first unit 20A, a simulator circuit is provided in fluid communication with the output side of the master cylinder 24. The simulator circuit is provided upstream of the isolation valve 52, meaning the side nearer the master cylinder and remote from the braking circuit so that the simulator circuit is kept in fluid communication with the master cylinder 24 when the isolation valve 52 is closed. The simulator circuit includes a pedal feel simulator 80 coupled to the master cylinder outlet 40 through a switchable simulator valve 84. The simulator valve 84 can be a normally-closed switchable solenoid valve operable to be opened by the controller to establish fluid communication between the master cylinder outlet 40 and the pedal feel simulator 80. When the simulator valve 84 is open, fluid pushed out of the master cylinder chamber through the outlet 40 is passed into the pedal feel simulator 80, which has a biasing mechanism that provides a feedback force to the brake pedal 28. Thus, the simulator circuit mimics the feel of actuating the wheel cylinders FL, FR when in fact the brake pedal 28 is decoupled by the isolation valve 52.

As described above, the first unit 20A of the braking system 20 can be implemented as a single-circuit integrated power brake (IPB) unit. Aspects of the construction of the IPB unit can be provided according to conventional practice. However, as noted above the IPB unit does not have fluid connections extending to some the wheel cylinders of the vehicle (i.e., the wheel cylinders RL, RR), whereas a conventional dual-circuit IPB unit would have fluid connections extending to all the vehicle wheel cylinders, at least for purposes of back-up mode operation in the event that brake-by-wire functionality was lost. Thus, the first unit 20A may be referred to as a simplified or de-contented IPB unit. Furthermore, the first unit 20A has additional structural features adapted for circuit fluid filling, for example at the time of system installation into a vehicle. Before discussing these in detail, it is noted that the second unit 20B of the brake system 20 shares most of the construction with the first unit 20A, though further de-contented. For example, the second unit 20B includes no master cylinder (nor input rod, nor input sensors) and no simulator circuit. Otherwise, the second unit 20B includes a reservoir 32, a circuit of brake lines and valves 44, 48, 52, 72 to the pair of wheel cylinders, and a plunger 60, according to the same layout and function as that described in relation to the first unit 20A. It is noted here that, unlike the separation valve 52 of the first unit 20A, the separation valve 52 of the second unit 20B is adapted to selectively open and close the fluid connection between the circuit (pressurized by the plunger 60) and the reservoir 32, as no master cylinder is present. The plungers 60 of both the first and second units 20A, 20B can be operated by the respective motors M in response to the actuation of the brake pedal 28 by the driver. It is also possible to actuate one or both plungers 60 in other scenarios, separate from driver input (e.g., adaptive cruise control, automatic collision avoidance, autonomous driving, etc.). The separation valves 52, which can be normally-open valves, in both units 20A, 20B are operable to be actuated closed by the ECU 1000 whenever the respective plungers 60 are activated for braking.

Figure 2:
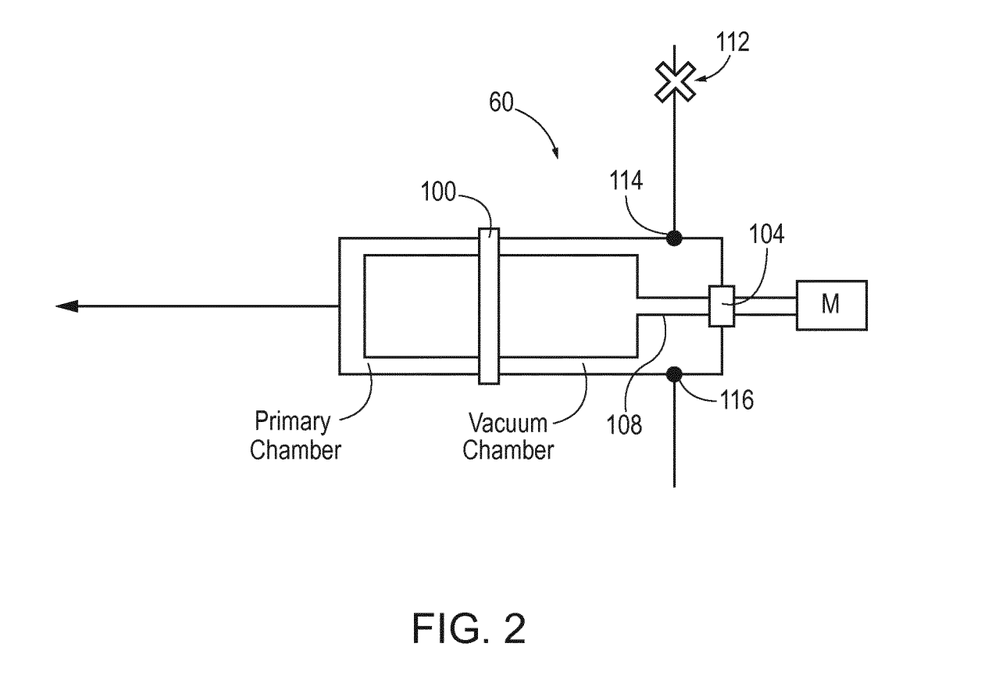
FIG. 2 is a detail view of a plunger, one of which is provided in each of the first and second units of the vehicle brake system.

As mentioned above, each of the units 20A, 20B has structural features adapted for circuit fluid filling. For example, each of the plungers 60 has a unique construction, illustrated in FIG. 2, that not only allows for pressurizing a front or outlet chamber having the outlet 68, but also separately defining a secondary or "vacuum" chamber on a rear side of the main or primary plunger seal 100. In particular, a second seal 104 is provided at the location where a plunger rod 108 exits the plunger chamber for connection to the motor M. Further, the vacuum chamber is coupled through a switchable valve 112 (e.g., electrically operable "auto-fill valve") to the reservoir 32. The auto-fill valve 112 can be normally-open and electrically closable by the ECU 1000. Each plunger 60 includes a first backside port 114, separate and spaced from the outlet 68, and the first backside port 114 is positioned between the main plunger seal 100 and the second seal 104 for connection to the fluid line having the auto-fill valve 112. Also positioned between the main plunger seal 100 and the second seal 104 is an additional or second backside port 116 connected through a fluid line to the outlet valves 48. As such, the outlet valves 48 and the associated wheel cylinders can be fluidly coupled to the reservoir 32 through the vacuum chamber of the plunger 60 in the event that the auto-fill valve 112 is in the open condition. In some constructions, the main plunger seal 100 is a movable seal that moves with the plunger to stroke or reciprocate in the plunger chamber, and the second seal 104 is in a fixed position. However, it is also possible in other constructions for the second seal 104 to be incorporated into the plunger rod 108 as a movable seal.

Figure 3:
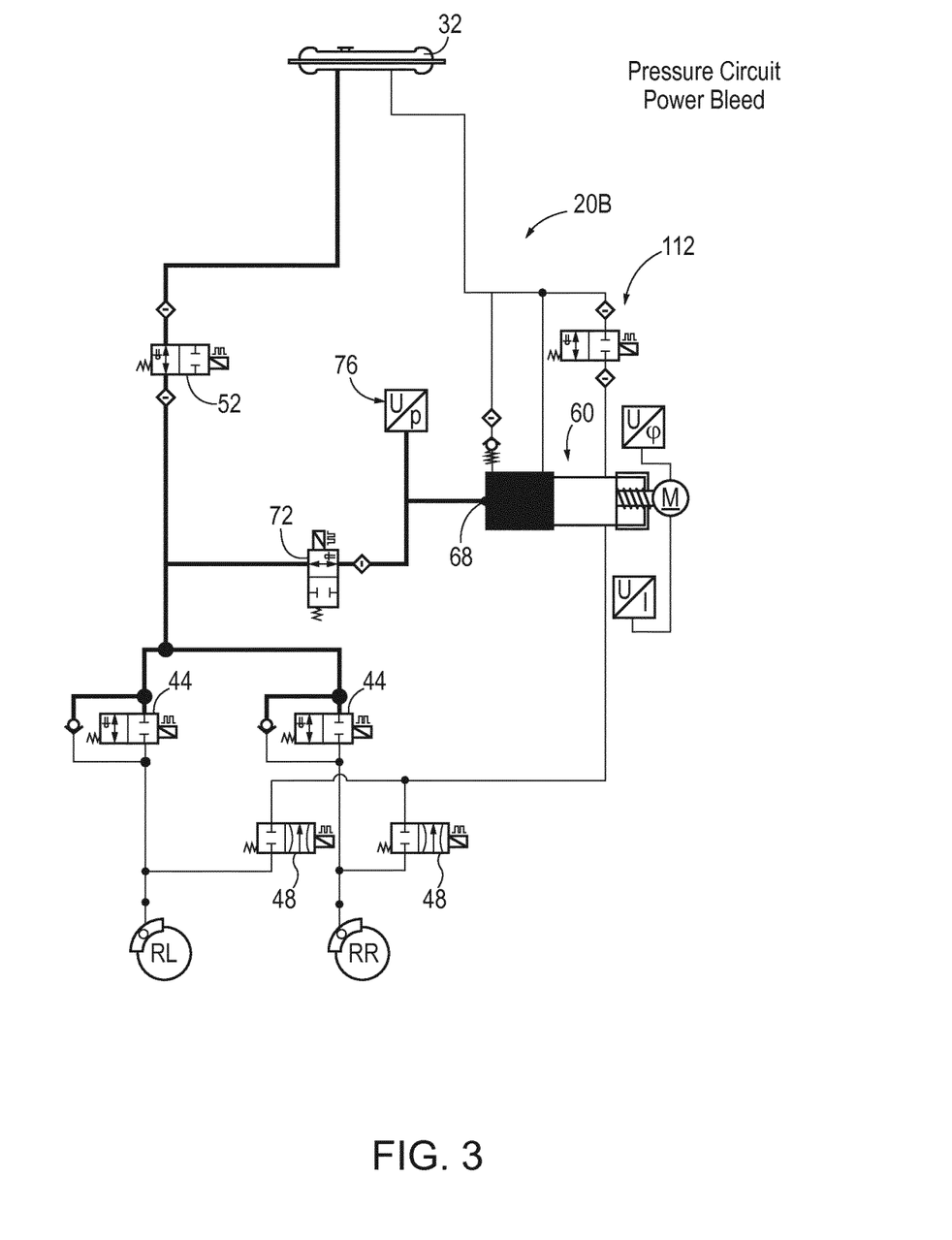
FIG. 3 is a schematic view of the second unit of the vehicle brake system during a first step of an automatic circuit fill operation.
Figure 4:
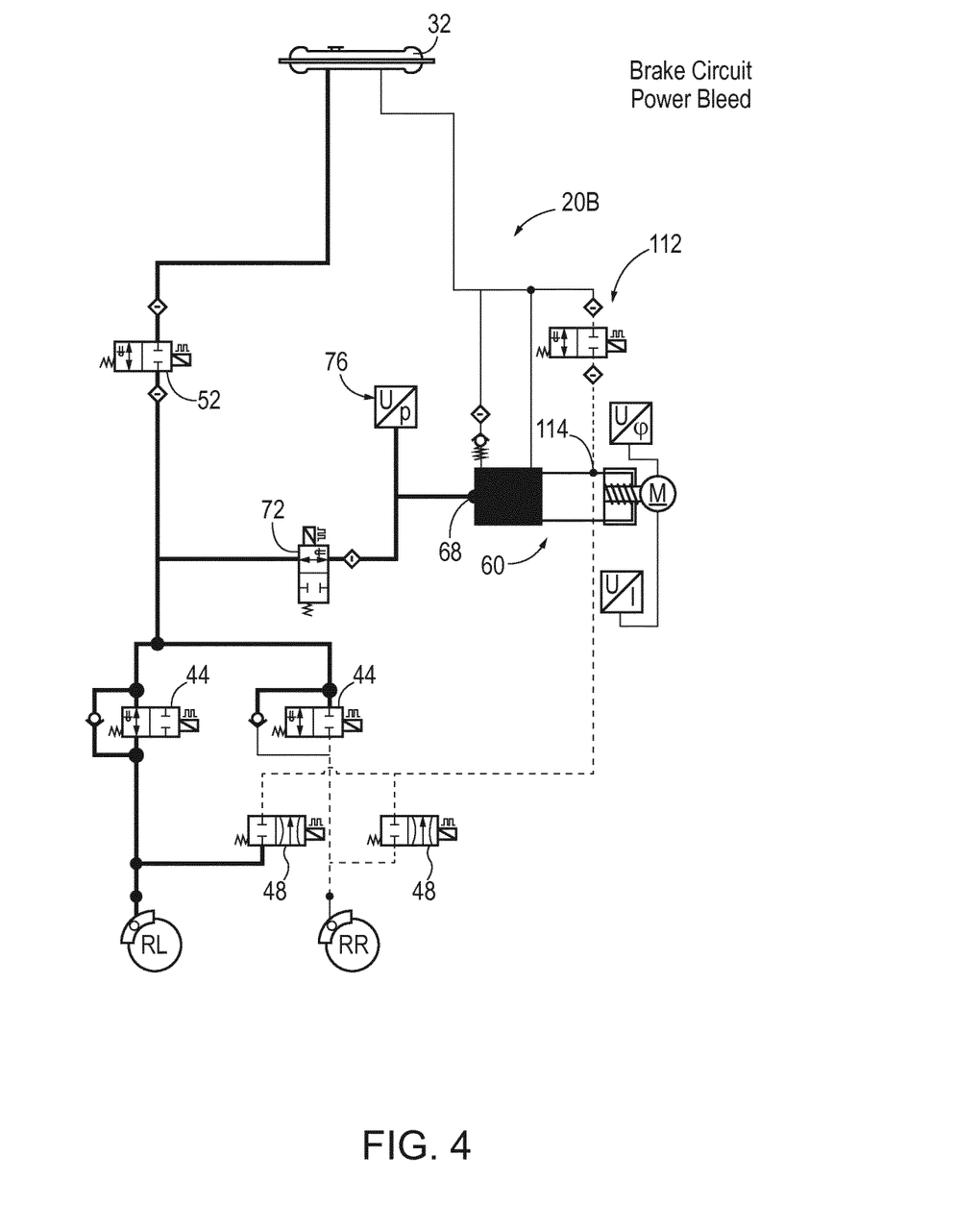
FIG. 4 is a schematic view of the second unit of the vehicle brake system during a second step of an automatic circuit fill operation.
Figure 5:
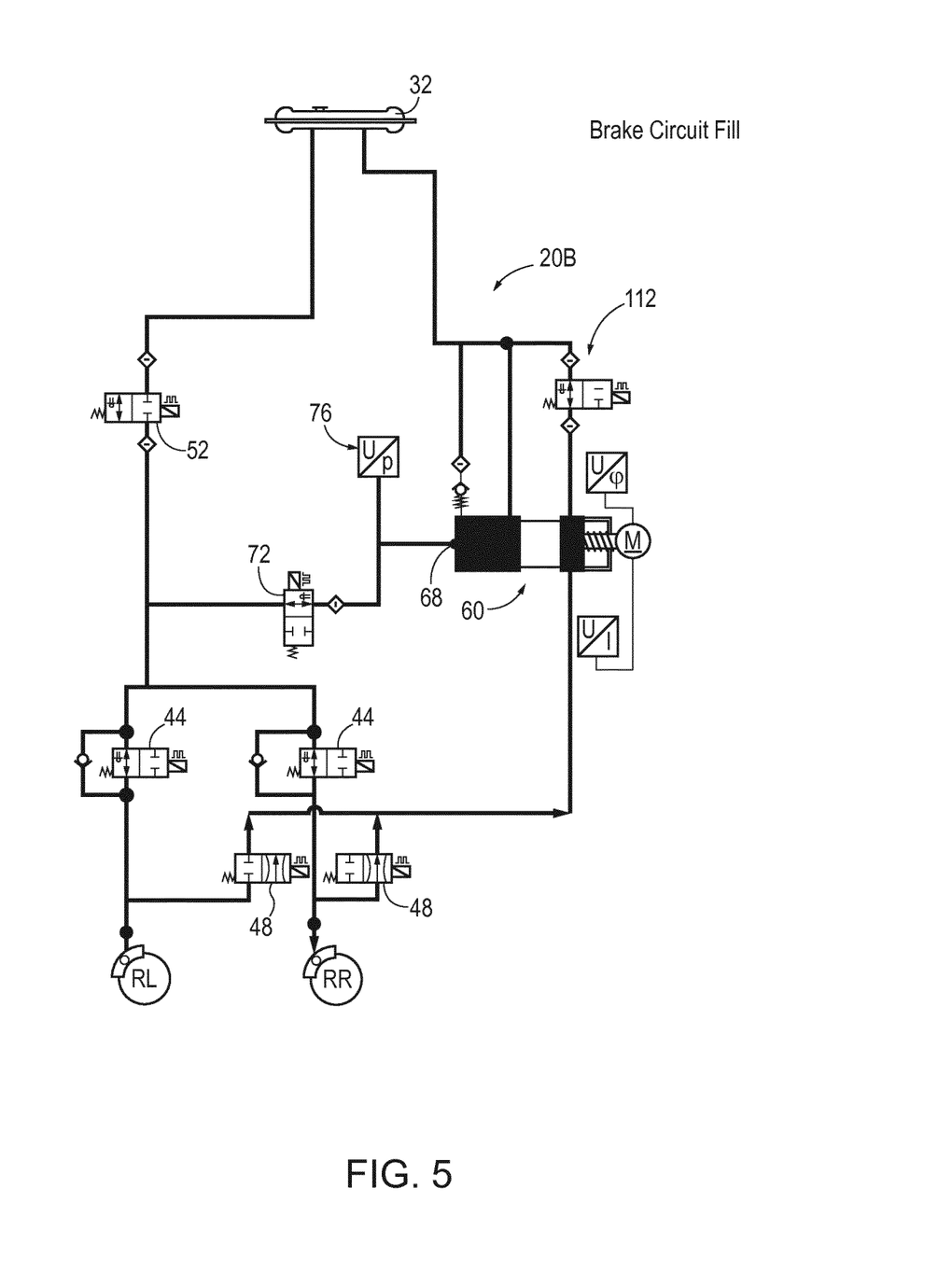
FIG. 5 is a schematic view of the second unit of the vehicle brake system during a third step of an automatic circuit fill operation.

The second seal 104 and the selectively closable auto-fill valve 112 enable a circuit fill operation to be completed as described herein. Although FIGS. 3-5 illustrate the steps of the circuit fill operation for the second unit 20B, the same steps can be carried out in the first unit 20A in the same way and a redundant description thereof is not separately provided. The circuit fill operation can be completed at the time of vehicle assembly when the brake system 20 is newly installed and brake fluid has yet to be disseminated through all the fluid channels (e.g., all the lines, valves, ports, etc.) of the circuit. During the circuit filling, circuit bleeding is also achieved. This step is critical to ensure that the circuit supplying the wheel cylinders is full of brake fluid and substantially bled of trapped gases such as air. As described below, the circuit fill operation can be entirely self-contained and conducted under the command of the ECU 1000. For example, the filling and bleeding of the brake unit, (20A, or 20B) is achieved without extraneous tools or equipment, and is achieved with the system access points (e.g., reservoir cap, wheel cylinder bleed ports) remaining closed. In particular, the method herein does not use a commonly-known vacuum fill tool that attaches to the brake system reservoir for pulling vacuum and then releasing a pressurized blast of brake fluid to the system. As such, in some constructions, the engineering design constraints for the reservoir 32 can be relaxed as the reservoir need not be exposed to high pressure to accomplish the circuit filling. The circuit filling operation can be a relatively autonomous action of the brake system 20 that requires no process planning or assembly line actions on the part of the vehicle manufacturer. The circuit filling operation can commence automatically when initially power-enabled by connection to an electrical source. Alternately, the circuit filling operation can commence in response to detection of a designated signal provided in response to an initialization scenario, which is either a predetermined time or condition, or provided directly by a programming command from the vehicle manufacturer, e.g., provided in the final vehicle assembly phase through the vehicle's main ECU.

The process of FIGS. 3-5 begins from a state in which the reservoir 32 has been filled with brake fluid. At the time of filling, all system valves may be in their at-rest or biased positions. Although some of the brake fluid may at least partially fill some of the fluid channels, further action is required to ensure that the entire unit is full and bled. As shown in FIG. 3, the first step of the circuit fill operation is a pressure circuit power bleed that includes a power stroke (i.e., an advancing stroke toward the outlet 68) of the plunger 60. The apply pressure control valve 72 is opened to allow fluid transmission toward the fluid line extending between the reservoir 32 and the inlet valves 44. The inlet valves 44 may be actuated closed. The separation valve 52 may be open or unactuated, allowing fluid connection to the reservoir 32. Light fluid pressurization from the plunger 60 with the inlet valves 44 closed provides a bleed function whereby trapped gases such as air are evacuated to the reservoir, leaving unaerated fluid in the portion of the circuit shown in bold in FIG. 3. The plunger 60 may be fully stroked to a maximum extent during this step, although it is possible in other constructions for the plunger 60 to complete only a partial advancing stroke.

Following the power bleed step of FIG. 3, the circuit fill operation transitions the brake unit 20B into the state of FIG. 4 for a brake circuit evacuation step. This transition includes closing the separation valve 52 and opening a first one of the inlet valves 44, while the apply pressure control valve 72 is left open. If not previously closed, the auto-fill valve 112 is actuated closed to block the vacuum chamber of the plunger 60 from the reservoir 32. In this valve array of the brake unit 20B, a subsequent advancing stroke of the plunger 60 is actuated (e.g., after the plunger is re-set from the actuation of the power bleed step). This plunger advancement causes, in one portion of the circuit, pressurization and fluid transmission through the open inlet valve 44 to the associated wheel cylinder (RL as shown). However, the same advancing plunger stroke simultaneously causes, in another portion of the circuit, generation of a partial vacuum or low pressure space in the fluid channels coupled to the vacuum chamber of the plunger 60 between the main plunger seal 100 and the secondary seal 104. The vacuum in indicated by the dashed lines in FIG. 4. In the illustrated construction, the vacuum extends to the closed inlet valve 44 and to the wheel cylinder (RR as shown) not yet filled with brake fluid. The vacuum also extends to the outlet valve 48 associated with the wheel cylinder (RL) that is filled in this step. The other outlet valve 48, which is associated with the wheel cylinder (RR) that is not yet filled, may optionally be opened to prevent air entrapment therein. In this interim state, the remaining unfilled portion of the circuit is below atmospheric pressure and prepared to accept fluid.

As shown in FIG. 5, the next step in the circuit fill operation is the remaining brake circuit fill step. In this step, the auto-fill valve 112 is opened so that additional fluid from the reservoir 32 can flow into the low pressure channels of the circuit that were partially evacuated in the step of FIG. 4. This may be the final step of the circuit fill operation. In other constructions, the circuit fill operation, prior to fully enabling the brake system 20 for use in vehicle operation, can include additional steps, such as an additional power bleed step. Further, in some constructions, the entire sequence of FIGS. 3-5 may be repeated one or more times to ensure proper fill and circuit bleed. Upon completion of the circuit fill operation, the auto-fill valve 112 may be permanently disabled for the remaining service life of the brake system 20 to leave a permanent connection between the reservoir 32 and the port 114. In other constructions, the circuit fill operation, or aspects thereof, that takes place at the time of vehicle assembly may be repeated as part of a vehicle service or maintenance procedure. The ECU 1000 may automatically carry out the circuit fill operation by detecting the service, or parameters thereof (e.g., draining and re-filling of the reservoir 32), or the ECU 1000 may be commanded by a service technician to carry out the circuit fill operation (e.g., through an electronic interface of the vehicle).

It should be understood that aspects of the invention, and in particular the circuit fill operation by which the brake unit(s) 20A, 20B automatically fill and bleed, can be implemented in a great number of different arrangements of brake systems, not necessarily subscribing to the exact layout of the brake system 20 illustrated and described herein. While the separate units 20A, 20B can consist of self-contained units in entirely separate housings that have their own dedicated mountings to the vehicle frame or sub-frame, this is not necessarily a requirement for all aspects of the invention. Although the brake system 20 as disclosed is capable of full brake by wire operation and well adapted to use in full electric drive vehicles, electric hybrid vehicles, and vehicles having powertrains with no/low natural vacuum for a conventional booster, aspects of the invention may provide benefits in a great variety of vehicles including but not limited to those mentioned above. Finally, it is also noted that another construction of the vehicle braking system, for use in vehicles capable of fully automated driving (and thus, having no brake pedal for driver use), can be provided with two of the "second" brake units 20B as shown in FIG. 1B, and without the "first" brake unit 20A of FIG. 1A.

What is claimed is:

1. A brake system for a vehicle, the brake system comprising:
   a brake unit having:
      a fluid reservoir for containing a volume of brake fluid therein;
      an electronic control unit (ECU);
      an electronically-controlled plunger operable to stroke in response to a control signal from the ECU to supply fluid pressure to at least one wheel cylinder for vehicle braking; and a brake circuit having the at least one wheel cylinder and, for each of the at least one wheel cylinder, a normally-open wheel cylinder inlet valve and a normally-closed wheel cylinder outlet valve, wherein the plunger includes:
- a rod coupled to an actuator,
- a primary seal coupled to the rod and arranged to seal against an inner wall of a plunger chamber, and
- a secondary seal surrounding the rod to seal an interface where the rod exits the plunger chamber,
- wherein a portion of the plunger chamber between the primary and secondary seals forms a vacuum chamber that is separated from a main plunger chamber outlet by the primary seal and coupled through a switchable valve to the fluid reservoir, wherein the brake unit has a configuration in which a portion of the brake circuit is connected with the main plunger chamber outlet to receive pressurized brake fluid supplied from the plunger, and simultaneously, the vacuum chamber of the plunger is connected with a second portion of the brake circuit to evacuate the second portion while isolated from the fluid reservoir by the switchable valve.

2. The brake system of claim 1, wherein the brake unit further includes:
- a brake pedal operable to receive a user input;
- at least one user input sensor operable to detect the user input;
- a master cylinder coupled to the brake pedal and defining a fluid chamber therein;
- a pedal feel simulator in fluid communication with the fluid chamber of the master cylinder to provide a reaction force to the brake pedal when the plunger operates to achieve braking at the at least one wheel cylinder corresponding to the user input; and
- an isolation valve having a closed position in which the master cylinder is isolated from the at least one wheel cylinder by the isolation valve.

3. The brake system of claim 2, wherein the brake unit is a first brake unit, the brake system further comprising a second brake unit having a second fluid reservoir and a second electronically-controlled plunger operable to stroke in response to a control signal from the ECU to supply fluid pressure to at least one wheel cylinder for vehicle braking, wherein the second plunger includes:
- a rod coupled to an actuator,
- a primary seal coupled to the rod and arranged to seal against an inner wall of a plunger chamber, and
- a secondary seal surrounding the rod and sealing an interface where the rod exits the plunger chamber,
- wherein a portion of the plunger chamber between the primary and secondary seals forms a vacuum chamber that is separated from a main plunger chamber outlet by the primary seal and coupled through a switchable valve to the fluid reservoir.

4. The brake system of claim 3, wherein the second brake unit further includes an isolation valve having a closed position in which the second fluid reservoir is isolated from the main plunger chamber outlet of the second plunger and the at least one wheel cylinder by the isolation valve.

5. The brake system of claim 3, wherein the first brake unit is a single-circuit integrated power brake (IPB) unit having connections to less than all the wheel cylinders of the brake system.

6. The brake system of claim 3, wherein the second brake unit includes no master cylinder.

7. The brake system of claim 1, wherein the brake unit has another configuration in which the second portion of the brake circuit is connected with the fluid reservoir through the vacuum chamber of the plunger and the switchable valve for charging the second portion of the brake circuit with fluid from the fluid reservoir through the plunger and the outlet valve.

8. The brake system of claim 1, wherein the portion of the plunger chamber between the primary and secondary seals is coupled to the fluid reservoir on a direct line having the switchable valve.

9. A method of operating a vehicle brake system for self-contained brake circuit filling, the method comprising:
- providing a brake unit having a reservoir filled with brake fluid;
- performing a pressure bleed on a first portion of a brake circuit within the brake unit by a first operation of a plunger in an advancing direction, under control of an electronic control unit (ECU) of the brake system;
- supplying pressurized brake fluid to a first wheel cylinder coupled to the first portion of the brake circuit, while simultaneously evacuating a second portion of the brake circuit in fluid communication with a vacuum chamber of the plunger, by a second operation of the plunger in the advancing direction, under control of the ECU; and
- supplying brake fluid from the reservoir into the second portion of the brake circuit by switching an auto-fill valve positioned between the reservoir and the vacuum chamber into an open condition, under control of the ECU.

10. The method of claim 9, wherein supplying brake fluid from the reservoir into the second portion of the brake circuit includes supplying brake fluid to a second wheel cylinder coupled to the second portion of the brake circuit.

11. The method of claim 9, further comprising maintaining the reservoir closed throughout the preceding steps and maintaining a bleed port of the first wheel cylinder closed throughout the preceding steps.

12. The method of claim 9, further comprising maintaining a closed state of an isolation valve positioned between the reservoir and an inlet valve to the first wheel cylinder during the second operation of the plunger in the advancing direction and during the supplying of brake fluid from the reservoir into the second portion of the brake circuit.

13. The method of claim 9, wherein the first operation of the plunger in the advancing direction is a full stroke of the plunger.

14. The method of claim 9, further comprising performing an additional pressure bleed on the brake circuit, under control of the ECU.

15. The method of claim 9, further comprising performing an additional supplying of pressurized brake fluid to the brake circuit, under control of the ECU.

* * * * *

UNITED STATES PATENT AND TRADEMARK OFFICE
CERTIFICATE OF CORRECTION

PATENT NO. : 11,332,108 B2
APPLICATION NO. : 16/759781
DATED : May 17, 2022
INVENTOR(S) : Timothy J. Albert It is certified that error appears in the above-identified patent and that said Letters Patent is hereby corrected as shown below:

In the Claims

In Column 7, Line 19 (Claim 1, Line 19), replace ", and simultaneously," with --, and simultaneously while the main plunger chamber outlet is isolated from the vacuum chamber,--.

In Column 8, Line 13 (Claim 7, Line 7), replace "through the plunger and the outlet valve." with --through the plunger.--.

Signed and Sealed this
Eleventh Day of October, 2022

*Katherine Kelly Vidal*
Katherine Kelly Vidal
*Director of the United States Patent and Trademark Office*